July 10, 1962
C. L. KELSO
3,043,361
PIPE WALL SUPPORTING MECHANISM
Filed Feb. 24, 1959
3 Sheets-Sheet 1
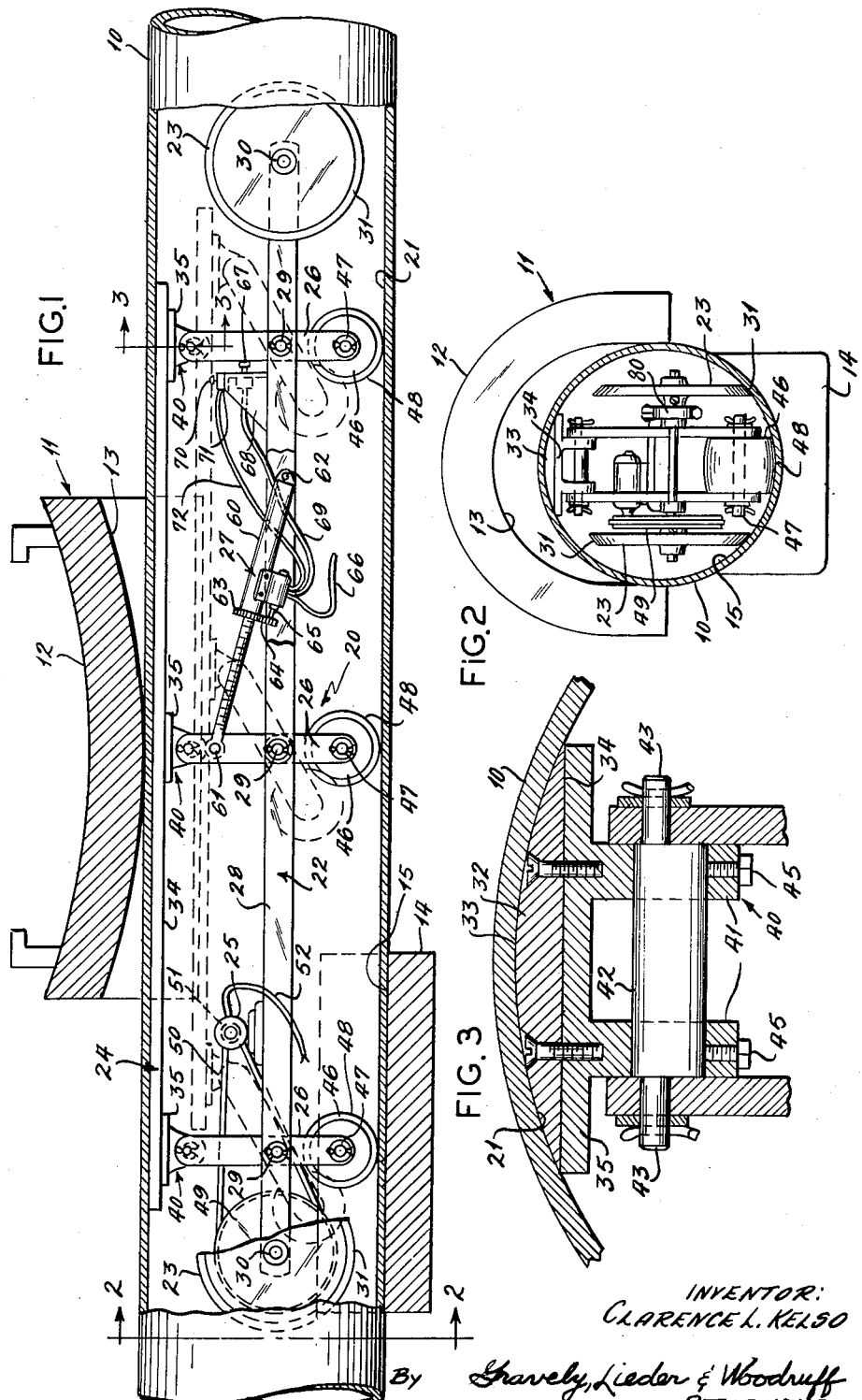
INVENTOR:
CLARENCE L. KELSO
By Gravely, Lieder & Woodruff
ATTORNEYS.

July 10, 1962  C. L. KELSO  3,043,361
PIPE WALL SUPPORTING MECHANISM
Filed Feb. 24, 1959  3 Sheets-Sheet 2
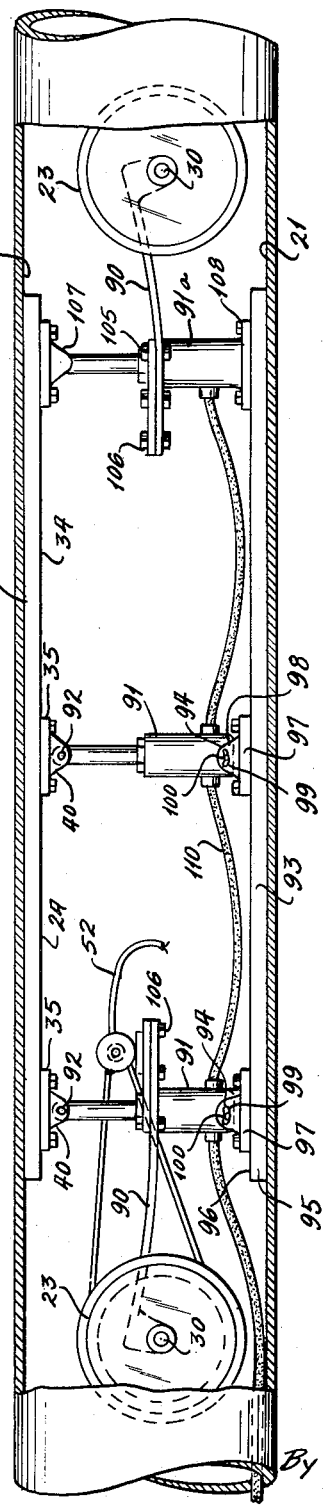
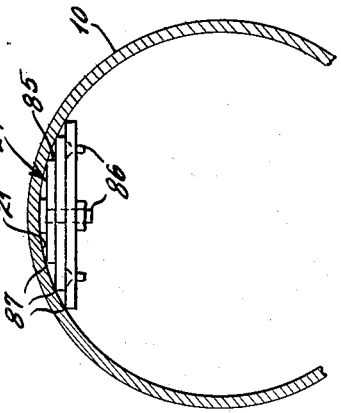
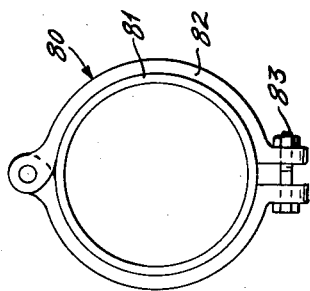
INVENTOR:
CLARENCE L. KELSO
By Gravely, Lieder & Woodruff
ATTORNEYS, July 10, 1962
C. L. KELSO
3,043,361
PIPE WALL SUPPORTING MECHANISM
Filed Feb. 24, 1959
3 Sheets-Sheet 3
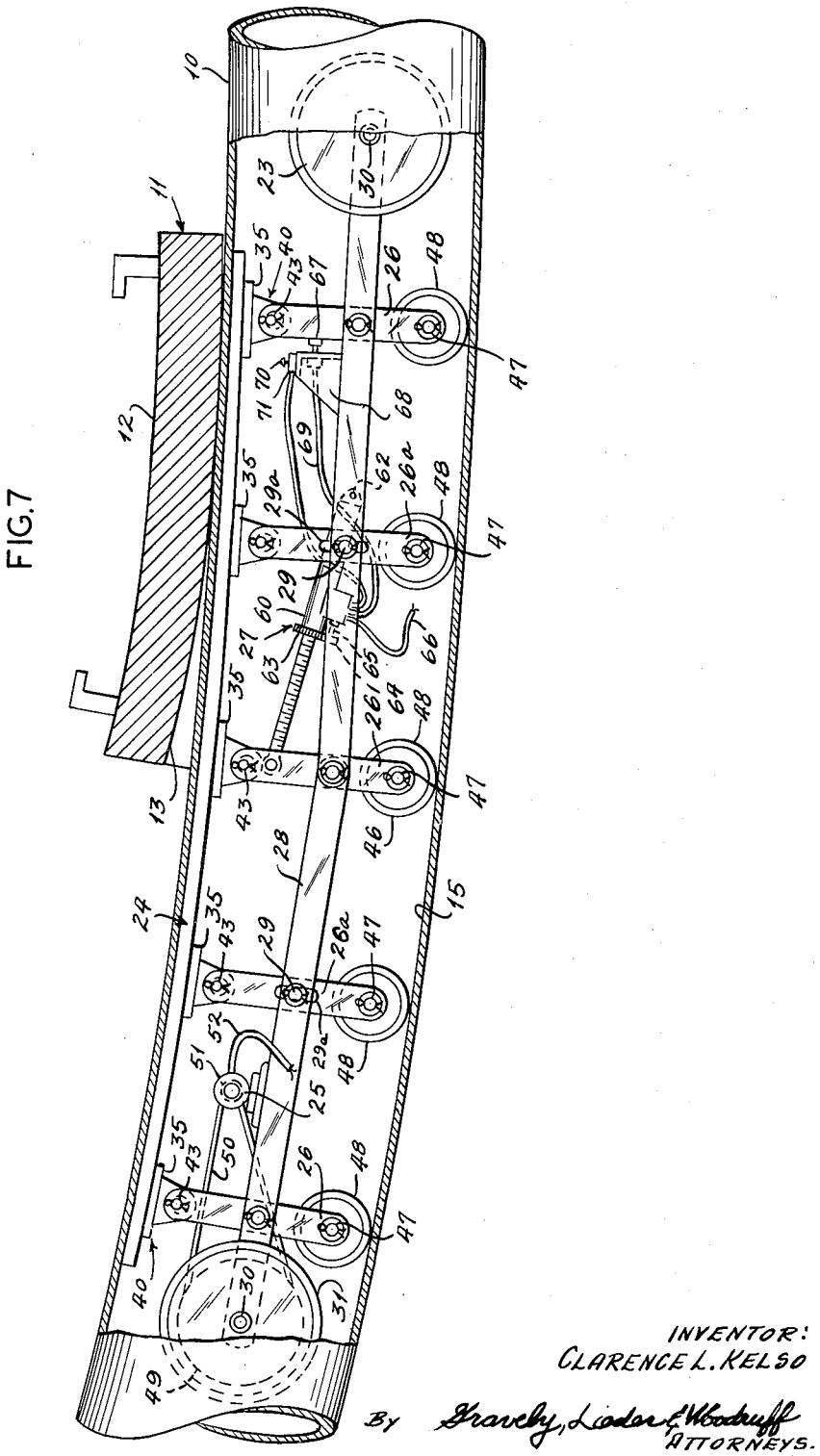
INVENTOR:
CLARENCE L. KELSO
By Gravely, Lister & Woodruff
ATTORNEYS.

3,043,361
PIPE WALL SUPPORTING MECHANISM
Clarence L. Kelso, Box 352, Oilton, Okla.
Filed Feb. 24, 1959, Ser. No. 795,166
7 Claims. (Cl. 153—63)

This invention relates generally to the pipe bending art, and in particular, to a novel pipe wall supporting mechanism which will resist the tendency of a pipe to buckle and wrinkle when it is bent by a pipe bending machine.

When pipe is bent, especially large diameter pipe, it has a tendency to buckle and wrinkle. In other words, the wall of the pipe on the inside contour of the bend becomes corrugated because it is in compression while the pipe wall on the outside of the bend is in tension. The thinner the pipe wall, the greater the tendency the pipe will have to buckle. Since it is easier to bend a thin walled pipe, and they are cheaper to fabricate, it is desirable to be able to bend such pipe without its buckling.

There have been many attempts in the past to solve this problem, but they have not been completely successful, for a variety of reasons. The most pronounced difficulty has been that the support jigs, themselves, were caught in the pipe when it was bent and could not be removed after the bending operation. The pipe had to be partially unbent to remove the jig.

Many of the devices were not adaptable to be used in the 40 to 60 foot lengths of pipe that are presently used on pipe lines. If they exerted sufficient pressure to hold the pipe walls during bending, they could not be inserted into the pipe, and if inserted could not be withdrawn after bending.

Some of the prior art devices included a series of round segments which expanded to fit the inside of the pipe. These segments provided only a series of flat surfaces in contact with the curved surfaces of the pipe when it was bent, and consequently the pipe buckled between the points of contact on each segment, with the buckles finally forcing the segments apart, thus jamming the device inside the bent pipe.

It is therefore an object of this invention to overcome the hereinbefore mentioned problems. More specifically, it is an object of this invention to provide an internal pipe wall supporting mechanism which can be used in conjunction with a pipe bending machine to bend large diameter pipe without its buckling or wrinkling.

It is a further object of this invention to provide a flexible support member for the inside wall of a pipe to support said inside wall while the pipe is bent.

Another object of this invention is to provide a flexible support member for supporting the inside wall of a pipe, said member being movable between a pipe wall supporting position and a carrying position, with a portion of the outer periphery of the member being in relatively continuous axial contact with the inner pipe wall which is in compression when the pipe is bent. Another object of this invention is to provide means in combination with the support member for holding said support member in buckle resisting contact with the internal pipe wall.

Still another object is to provide a carriage for the support member, and means for moving the carriage and support member into and out of an elongated large diameter, thin walled pipe. A further object is to provide friction compensating means to take care of any shifting of the internal wall support member or the carriage while the pipe is being bent.

These and other objects and advantages will become apparent hereinafter.

The present invention comprises an internal pipe wall support mechanism, and means for moving said mechanism into pipe wall supporting position. More particularly, the invention includes a flexible support member for the internal wall of a pipe while it is being bent, said member being movable between a pipe wall supporting position and a carrying position, together with means for moving said member into and out of a pipe.

The invention further consists in the pipe wall support mechanism, and in the parts and combinations of parts hereinafter described and claimed.

In the drawings:
FIG. 1 is a side elevational view of the novel pipe wall supporting mechanism of this invention inserted into a pipe with the pipe wall partially broken away and the pipe bending machine in section, the solid lines showing the mechanism in pipe wall supporting position, and the broken lines showing the mechanism in carrying position, FIG. 2 is a sectional view taken along lines 2—2 of FIG. 1, FIG. 3 is a greatly enlarged sectional view taken along lines 3—3 of FIG. 1, FIG. 4 is a greatly enlarged view of the brake construction of this pipe wall supporting mechanism, FIG. 5 is a greatly enlarged view of a modification of the pipe wall support member of this invention showing said member inserted against the inner wall of a pipe in pipe wall supporting position, FIG. 6 is a view similar to FIG. 1 showing a modification of the pipe wall supporting mechanism of this invention, and FIG. 7 is a side elevational view of the pipe wall supporting mechanism inserted into a pipe with the pipe wall partially broken away and the pipe bending machine in section showing the relative position of the pipe supporting mechanism and the pipe after the pipe has been bent.

FIG. 1 shows a pipe 10 inserted in a pipe bending machine 11. The pipe bending machine 11 used for purposes of illustrating this invention is of the portable and vertical bending machine type, although it is understood that the present invention is not limited to use with this type bending machine, but can be used with any conventional bending machine. The bending machine 11 shown in FIG. 1 includes a convex bending shoe 12 having a trough-like bending surface 13. A straight member 14 having a trough-like surface 15 is located below the bending shoe 12, and extends some distance in front of said shoe 12.

When the pipe 10 is bent, it is set in the trough 15 and the member 14 is moved upward, thus urging the pipe into the bending shoe 12 and bending it against the bending surface 13.

FIG. 1 shows the unique pipe wall supporting mechanism 20 of this invention inserted into the hollow center of the pipe 10 which is defined by the pipe innerwalls 21. The solid lines of FIG. 1 show the mechanism 20 in pipe wall supporting position, while the broken lines show the mechanism 20 in carrying position.

The pipe wall supporting mechanism 20 includes a carriage frame 22, carriage moving wheels 23, a pipe supporting member 24, driving means 25, legs 26, and means 27 for moving the pipe supporting member 24 between carrying position and pipe supporting position.

The carriage frame 22 includes spaced apart longitudinal members 28. The frame 22 is so constructed to carry the wheels 23, the driving means 25, the legs 26, and the pipe support moving means 27.

The legs 26 are attached to the longitudinal members 28 of the frame 22 by pivot pins 29. The longitudinal members 28 are broken near the center leg 26 to keep the frame 22 from bending when the pipe 10 is bent. This can be seen more clearly in FIG. 7.

The wheels 23 are attached to the carriage frame 22 by axles 30. As shown in FIGS. 1 and 2, there are preferably four wheels having arcuate outer margins 31 which correspond to the curve of the inner wall 21 of the pipe 10. The wheel 23 and axle 30 connections are suitably fitted in any well known manner.

The novel pipe wall supporting means 24 of this invention comprises an elongated stiffly flexible member 32 having an outer periphery in the form of an arcuate pipe wall supporting surface 33, a portion of which is in relatively continuous axial engagement with the pipe innerwall 21 which is in compression when the pipe 10 is bent, and a flat surface 34 connecting the ends of the arcuate surface 33, thus giving member 32 a cross-section similar to a segment of a circle as may be seen in more detail in FIG. 3. Bracket supports 35 are fastened adjacent and intermediate of the ends of the flexible member 32 as desired. The bracket supports 35 are attached to the flat surface 34 of the flexible member 32, and serve as mounts for the brackets 40 which connect the pipe support means 24 to the legs 26, which in turn hold said pipe support means 24 in either pipe wall supporting position or carrying position.

The brackets 40 are shown in greater detail in FIG. 3, and include spaced apart side members 41, connected by axles 42 which are provided on either end with eccentrics 43. The eccentrics 43 are connected to the legs 26 as will be hereinafter more fully described. The side members 41 carry set screws 45 which can be tightened down on the axles 42 to lock the eccentrics 43 in any position. The eccentrics 43 are used because thick wall and thin wall pipe of the same outside diameter have different inside diameters, and a compensation for this difference is needed. The eccentrics are used to adjust the effective length of the legs 26 thus compensating for different pipe wall thicknesses.

The legs 26 are formed in spaced apart pairs, are pivoted at one end to the eccentrics 43 and are movably mounted on the pivots 29. Friction reducing means such as rollers 46 are positioned in the opposite end of the legs 26 by the axles 47. The rollers 46 have an arcuate bearing surface 48 which corresponds to the curvature of the inside wall 21 of the pipe 10. When the pipe wall supporting machine 20 is in the pipe wall supporting position of FIG. 1, the rollers 46 take the load exerted by the bending piece against the pipe support member 24. When the pipe 10 is bending, the mechanism 20 has a tendency to shift position, and the rollers 46 allow this movement to take place.

The rollers 46 also eliminate or reduce the friction present when the legs 26 are moved into a perpendicular position after the pipe support member 24 is in contact with the inner pipe wall 21. The jack 60 has to exert less power to move the legs 26 into the perpendicular position when the rollers 46 are attached to the legs 26. After the pipe has been bent (FIG. 7), the pipe walls exert a powerful compressive force on the legs 26, and without the friction reducing means 46 on the legs 26 a tremendous force would be necessary to move the legs 26 and pipe support member 24 back into carrying position.

FIG. 1 shows three legs 26 located one near each end and one near the center of the frame 22, with the frame 22 hinged at the pivot 29 which attaches the center leg 26 to the longitudinal members 28. This is a preferred embodiment of the present invention, but in certain instances more legs 26 may be desirable. If more than three legs 26 are used (FIG. 7), either the frame 22 must be hinged at each extra leg 26a as well as the center leg 26 or some of the legs may be formed with slots 29a wherein the pins 29 reside. Thus, when the pipe is bent, the frame 22 can move up and down on the legs 26 and the frame 22 is not bent.

The driving means 25 is fastened to the frame 22 in a suitable manner, and is used to drive the pipe support mechanism 20 into and out of the pipe 10. This is important in pipes formed in long sections, but the wall supporting mechanism 20 can be manually moved into position in smaller length pipes. The driving means 25 is illustrated as being an electric motor, and can be connected in any suitable manner to drive the wheels 23, but in the preferred arrangement, a driving wheel 49 is fastened to the axle 30 between the wheels 23 in such a position that it does not interfere with the leg 26 moving into carrying position, and a belt 50 connects said driving wheel 49 to a pulley 51 driven off the shaft of the motor 25. The motor 25 is preferably of the reversible type and is controlled by lead-in wires 52 leading to a control switch located remote from the mechanism 20 and preferably externally of the pipe 10.

The pipe wall support member 24 is moved between the carrying position and pipe wall supporting position by a jack 60 which is pivoted at 61 to the middle leg 26, and pivoted at 62 to the frame 22. The jack 60 is moved by a gear wheel 63 which is meshed with a gear wheel 64 driven off the shaft 65 of moving means 27. The moving means 27 is preferably a reversible electric motor. The motor 27 is activated remote from the mechanism 20 and preferably from the outside of the pipe 10 by means of wires 66 leading to an external switch.

When the mechanism 20 has been moved into position inside the pipe 10, the motor 27 is activated, and jack 60 extends moving wall support member 24 from carrying position into pipe wall supporting position. The legs 26 move toward a position perpendicular to the frame 22. The motor 27 is inactivated when the legs 26 contact a switch button 67 which is mounted on a support 68 fastened to the frame 22 and which is connected to the motor 27 by wires 69. After the motor 27 is stopped, the pipe support member 24 is held against the inner pipe wall 21 by legs 26 extended against the opposite inner pipe wall 21.

After the pipe 10 is bent, the pipe support member 24 is retracted from pipe wall supporting position to carrying position by reversing the motor 27. The jack 60 is retracted and carries the support member 24 toward the frame 22 until the flat surface 34 contacts a switch 70 carried on a platform 71 which is mounted on the support 68. The switch 70 is connected to the motor 27 by wires 72 and inactivates said motor 27 when engaged as above described. The mechanism 20 can be removed from the pipe 10 by reversing the motor 25.

To insert the mechanism 20 into the pipe 10, it is placed in the trough 15 of the straight member 14 of the bending machine 11 in carrying position (as shown by the broken lines of FIG. 1) with the weight on the wheels 23. The pipe 10 is also placed in the trough 15. The motor 25 is activated as hereinbefore described in detail, and carries the mechanism 20 into the pipe 10. The mechanism 20 is stopped when it is inside the pipe 10 under the bending shoe 12. The pipe wall support member 24 is raised against the inside pipe wall 21 as hereinbefore described. The straight member 14 then moves the pipe 10 against the shoe 12, thus bending the pipe 10 to fit the curvature of the shoe 12. The wall support member 24 is pressed tightly against the inside pipe wall 21 and acts somewhat like a flexible mold, sandwiching the pipe 10 between the support member 24 and the bending shoe 12, thus making a smooth bend without wrinkles or buckles. After the pipe 10 is bent, the support member 24 is retracted to carrying position as hereinbefore described, and the mechanism 20 can be driven out of the pipe 10 by reversing the motor 25.

It is contemplated that the energy to run the motors 25 and 27 can come from an outside source, or can come from a battery mounted on the frame 22.

It is also contemplated that the jack 60 can be a hydraulic cylinder with hoses leading to a control valve located outside of the pipe 10.

A brake 80 is provided to keep the machine 20 from rolling if the pipe 10 is not level. The brake 80 is shown in detail in FIG. 4 and is shown mounted on an axle 30 in FIG. 2. Included in the brake assembly 80 are a brake drum 81, a brake band 82, and an adjusting bolt 83 for the band 82. The band 82 is attached to the frame 22 and can be tightened down on the axle 30 by the adjusting bolt 83. Before the mechanism 20 is driven into the pipe 10, the brake 80 is set to a predetermined degree sufficient to keep the mechanism 20 from rolling.

A modification of the pipe wall support member 24 is shown in FIG. 5. This type construction includes a plurality of elongated flat rectangular shaped stiffly flexible members 85 secured together by fastening means 86 such as screws or bolts. The members 85 vary in width such that the corners 87 contact the inner pipe wall 21 in substantially continuous axial engagement and provide support therefor when the pipe 10 is bent. The corner contacts 87 must be spaced in such a manner that they are not so far apart as to allow the pipe wall to buckle. This arrangement is somewhat similar to an ordinary leaf spring construction, with the leaves increasing in size from the pipe wall 21 inward toward the center of the pipe 10.

A modification of my construction is shown in FIG. 6. In this construction, the frame is modified, as are the means to hold the pipe wall support member in pipe wall supporting position. These modifications will be more fully explained hereinafter. When parts similar to those shown in FIG. 1 through FIG. 5 are used, similar numbers will be used.

Wheels 23 mounted on axles 30 are used to move the pipe wall supporting mechanism 20 into and out of a pipe 10. The wheel 23 and axle 30 assemblies are mounted on resilient frame members 90. Hydraulic jacks 91 and 91a carrying the pipe wall support member 24 are connected to the frame members 90. In the preferred embodiment of my invention, three jacks are used, with two of the jacks 91 being connected to the pipe wall support member 24 at pivots 92 and to the opposite pipe wall brace member 93 by pin and slot connections 94. The pipe wall brace member 93 has an arcuate outer surface 95 and a flat face 96 connecting the ends of the outer surface 95. Brackets 97 are fastened to the flat face 96 of the pipe wall brace member 93 and connect the member 93 to the jacks 91. The brackets 97 have spaced apart side walls 98 provided with slots 99. The jacks 91 are provided with pins 100 which are entrapped in the slots 99 to form the slidable pin and slot connections 94.

The pipe wall support member 24 has an arcuate pipe wall supporting surface 33 and a flat surface 34 connecting the ends of the arcuate surface 33. Bracket supports 35 are fastened to the surface 34 and carry the brackets 40 which connect the member 24 to the jacks 91 by means of the pivots 92.

The resilient frame members 90 are fastened to the axles 30 in spaced apart relationship, and converge to the apex of a V around the jacks 91 and 91a to which they are connected by the pins 105. The frame members 90 are connected together by a bolt 106 to form a platform for the drive means 25 which is connected as hereinbefore described to the drive wheel 49. The mechanism 20 is moved into and out of the pipe 10 when the drive means 25 is activated, preferably from outside said pipe 10 by means of switches connected to the wires 52. The motor 25 is preferably of the reversible type.

A third jack 91a is rigidly connected at brackets 107 and 108 to the pipe wall support member 24 and the opposite pipe wall brace member 93 respectively.

When this modification of the present invention is utilized in combination with a pipe bending machine 11, the pipe 10 to be bent is placed in the trough 15 and the mechanism 20 is also placed in said trough 15. The switches controlling the motor 25 are activated and the mechanism 20 is moved inside the pipe beneath the section to be bent.

After the mechanism 20 is stopped, the jacks 91 and 91a are activated by means of valves located exteriorly of the pipe 10 which control the pressure to the jacks 91 and 91a through the lines 110. This extends the jacks 91 and 91a from a carrying position, wherein the wall support members 24 and 93 are spaced apart from the interior pipe walls 21 and are carried in said spaced apart relationship by the resilient frame members 90 and the wheels 25, to a pipe wall supporting position, wherein the arcuate pipe wall supporting surface 33 of the member 24 is adjacent to the interior pipe wall 21 which is in compression in bending, and the arcuate surface 95 of member 93 is adjacent the interior pipe wall 21 which is in tension in bending. The resilient frame members 90 bend allowing the pipe wall support members 24 and 93 to come to rest against the interior pipe wall 21. If the frame members 90 are too rigid, the bottom brace member 93 will not reach the desired bracing position, and if the members 90 are too limber, they will not support the member 93 away from the interior pipe wall 21 when in carrying position.

The pipe wall which is being bent is sandwiched between the member 24 and the bending shoe 12 with sufficient pressure to insure a smooth bend with no buckles or wrinkles. The pivots 92 and the pin and slot connections 94 compensate for any movement in the relative position of the pipe wall support members 24 and 93 during bending. This is similar to the compensation provided by rollers 46 in the configuration shown in FIG. 1.

After the pipe 10 is bent, the valves are opened and the jacks 91 and 91a are compressed, moving the pipe wall support members 24 and 93 toward each other from pipe wall supporting position to carrying position. The rigid connections at 107 and 108 between the jack 91a and the members 24 and 93 respectively, keep the members 24 and 93 in a relatively parallel relationship during traveling.

Thus it is seen that the present invention embodies a novel pipe wall supporting machine which fulfills all the objects and advantages sought therefor.

This invention is intended to cover all changes and modifications of the examples of the invention herein chosen for purposes of the disclosure, which do not constitute departures from the spirit and scope of the invention.

What is claimed is:

1. A pipe wall supporting mechanism constructed and arranged to be expanded inside a pipe from a carrying position to a position engaging an inner wall of the pipe to maintain said pipe wall from buckling when the pipe is bent, comprising a frame, means to move said frame into and out of the pipe, an elongated stiffly flexible support member having an outer periphery substantially conforming to the inside pipe wall, said member being movable between a wall supporting position and a carrying position, the outer periphery of said member being in relatively continuous axial contact with the inner surface of the pipe wall having the smaller radius when the pipe is bent, a leg pivotally connected to said frame and to said pipe wall support member and constructed and arranged to carry said pipe wall support member apart from said pipe wall when in carrying position and to support said pipe wall support member in pipe wall supporting position, said pivotal connection of said leg to said pipe wall support member including a bracket fixed to said pipe wall support member, an axle rotatably housed in said bracket, means for locking said axle in a fixed non-rotative position with respect to said bracket, and means pivotally connecting said axle to said leg, said means being eccentric with respect to the center line of said axle, said axle being rotatable with respect to said bracket to increase the effective length of said leg to thereby compensate for differences in the inside diameter of a pipe, friction reducing means carried by said leg at the end opposite said pipe wall support member connection, and means controlled remote from said mechanism to move said pipe wall support member including a reversible jack carried by said frame and operatively connected to said leg to move said pipe wall support member into pipe wall supporting position.

2. A pipe wall supporting mechanism constructed and arranged to be expanded inside a pipe from a carrying position to a position engaging an inner wall of the pipe to maintain said pipe wall from buckling when the pipe is bent, comprising a frame, means controlled remote from said mechanism to move said frame into and out of the pipe comprising wheels carried by said frame, said wheels being supported on a horizontally positioned axle and engaging the inner wall of the pipe and supporting the weight of the mechanism when said mechanism is in carrying position and being spaced from the pipe inner wall when said mechanism is in a pipe wall supporting position, and driving means for said wheels, an elongated flexible support member having an outer periphery substantially conforming to the inside pipe wall, said member being movable between a wall supporting position and a carrying position, said member being axially deformable so that the outer periphery of said member is in relatively continuous axial contact with the inner surface of the pipe wall having the smaller radius when the pipe is bent, said member regaining its original form when moved to carrying position after the pipe is bent, means to move said pipe wall support member between carrying position and pipe wall supporting position comprising a leg pivotally connected to said frame and to said pipe wall support member and so constructed and arranged to carry said pipe wall support member apart from said pipe wall when in carrying position and to support said pipe wall support member in pipe wall supporting position and reversible jack means pivotally connected to said frame and to said leg, power actuated driving means for said jack means, said driving means being controllable remote from said mechanism, and friction reducing means on said leg at the end opposite said pipe wall support member connection to facilitate moving the pipe wall support member into pipe wall supporting position and to compensate for shifting of the mechanism when the pipe is bent.

3. A pipe wall supporting mechanism constructed and arranged to be expanded inside a pipe from a carrying position to a position engaging an inner wall of the pipe to maintain said pipe wall from buckling when the pipe is bent, comprising a resilient frame, wheel means connected to said frame to move said frame into and out of the pipe, said wheel means being supported on a horizontally positioned axle and engaging the inner wall of the pipe and supporting the weight of the mechanism when said mechanism is in carrying position and being spaced from the pipe inner wall when said mechanism is in a pipe wall supporting position, an elongated flexible support member having an outer periphery substantially conforming to the inside pipe wall, said member being movable between a wall supporting position and a carrying position, the outer periphery of said member being in relatively continuous axial contact with the inner surface of the pipe wall having the smaller radius when the pipe is bent, said support member having sufficient rigidity to support said pipe wall continuously during bending and having sufficient flexibility to conform to the curvature of said pipe wall during bending, jack means carried by said frame and carrying said support member, said jack means being extendable to move said support member into pipe wall supporting position.

4. A pipe wall supporting mechanism constructed and arranged to be expanded inside a pipe from a carrying position to a position engaging an inner wall of the pipe to maintain said pipe wall from buckling when the pipe is bent, comprising a resilient frame, wheel means connected to said frame to move said frame into and out of the pipe, an elongated stiffly flexible support member having an outer periphery substantially conforming to the inside pipe wall, said member being movable between a wall supporting position and a carrying position, said member being axially deformable so that the outer periphery of said member is in relatively continuous axial contact during the bending operation with the inner surface of the pipe wall having the smaller radius when the pipe is bent, said member regaining its original form when moved to carrying position after the pipe is bent, a brace member in contact with the inner pipe wall which is in tension when the pipe is bent, jack means carried by said frame and carrying said support member and said brace member at opposite ends thereof, said jack means being extendable within said pipe to move said support member into pipe wall supporting position.

5. A pipe wall supporting mechanism constructed and arranged to be expanded inside a pipe from a carrying position to a position engaging an inner wall of the pipe to maintain said pipe wall from buckling when the pipe is bent, comprising a resilient frame, wheel means connected to said frame to move said frame into and out of the pipe, the wheels engaging the inner walls of the pipe when the mechanism is in carrying position, an elongated flexible support member having an outer periphery substantially conforming to the inside pipe wall, said member being movable from a carrying position to a pipe wall supporting position, the outer periphery of said member being in relatively continuous axial contact with the inner surface of the pipe wall having the smaller radius when the pipe is bent, a brace member, hydraulic jack means carried by said frame and carrying said support member and brace member at opposite ends thereof, said jack means holding said support member and said brace member away from the pipe inner wall when the mechanism is in carrying position and being extendable to move said support member into pipe wall supporting position and said brace member into contact with the inner pipe wall which is in tension when the pipe is bent, and control means to activate the hydraulic jack means, said means being located remote from the mechanism.

6. A pipe wall supporting mechanism constructed and arranged to be expanded inside a pipe from a carrying position to a position engaging an inner wall of the pipe to maintain said pipe wall from buckling when the pipe is bent, comprising a resilient frame, wheel means connected to said frame to move said frame into and out of the pipe, drive means for said wheel controllable remote from said mechanism, an elongated flexible support member, said member being movable between a wall supporting position and a carrying position, the outer periphery of said member being in relatively continuous axial contact with the inner surface of the pipe wall having the smaller radius when the pipe is bent, a brace member, a plurality of hydraulic jack means carried by said frame spaced along the length thereof and carrying said support member and brace member at opposite ends thereof, said jack means holding said support member and said brace member away from the pipe inner wall when the mechanism is in carrying position and being extendable within the pipe to move said support member into pipe wall supporting position and said brace member into contact with the inner pipe wall which is in tension when the pipe is bent, a common source of hydraulic fluid for all of said hydraulic jack means, and control means to activate the hydraulic jack means, said control means being located remote from the mechanism.

7. A pipe wall supporting mechanism constructed and arranged to be expanded inside a pipe from a carrying position to a position engaging an inner wall of the pipe to maintain said pipe wall from buckling when the pipe is bent, comprising a frame, wheels carried by said frame, said wheels being supported on a horizontally positioned axle and engaging the inner wall of the pipe and supporting the weight of the mechanism when said mechanism is in carrying position and being spaced from the pipe inner wall when said mechanism is in a pipe wall supporting position, an elongated stiffly flexible support member having an outer periphery substantially conforming to the inside pipe wall, said member being movable between a wall supporting position and a carrying position, a portion of the outer periphery of said member being in substantially continuous axial contact during the bending operation with the inner surface of the pipe wall having the smaller radius when the pipe is bent, said support member having sufficient rigidity to support said pipe wall continuously during bending and having sufficient flexibility to conform to the curvature of said pipe wall during bending, means controlled remote from said mechanism and carried by said frame to move said pipe wall support member between a carrying position and a pipe wall supporting position, and a member pivotally connected to said frame and said pipe wall support member and constructed and arranged to carry said pipe wall support member apart from said pipe wall when in a carrying position and to hold said pipe wall support member adjacent an inner pipe wall when in a pipe wall supporting position.

References Cited in the file of this patent

UNITED STATES PATENTS

| | | | |
|---|---|---|---|
| 1,105,914 | Miller | Aug. 4, | 1914 |
| 1,654,697 | Mueller et al. | Jan. 3, | 1928 |
| 2,347,593 | Cummings | Apr. 25, | 1944 |
| 2,356,603 | Marchbanks | Aug. 22, | 1944 |
| 2,371,393 | Horrigan | Mar. 13, | 1945 |
| 2,380,344 | Sutton | July 10, | 1945 |
| 2,401,052 | Cummings | Mar. 28, | 1946 |
| 2,594,000 | Elliott | Apr. 22, | 1952 |
| 2,638,069 | Mearns | May 12, | 1953 |
| 2,687,763 | Perkins | Aug. 31, | 1954 |
| 2,733,502 | Van Leer | Feb. 7, | 1956 |

FOREIGN PATENTS

| | | | |
|---|---|---|---|
| 768,753 | Great Britain | Feb. 20, | 1957 |